Oct. 27, 1925.
C. N. BREIT
HEDGE CUTTER
Filed Dec. 21, 1922
1,558,665
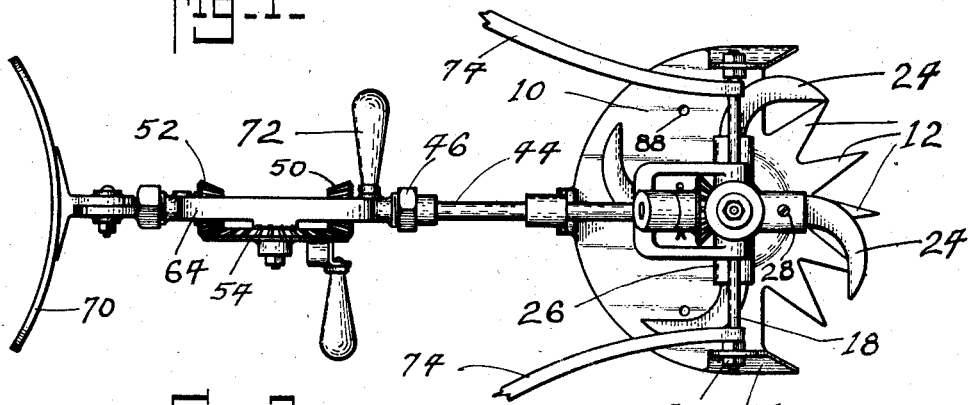
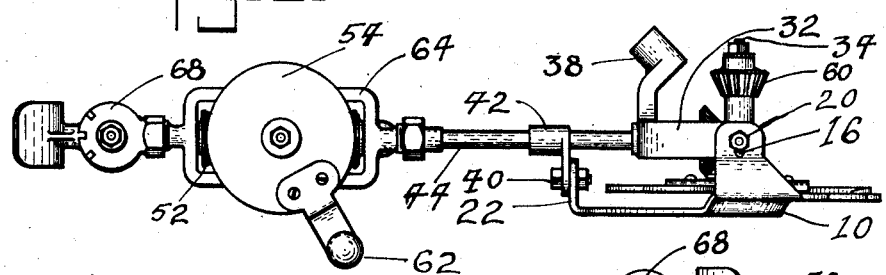
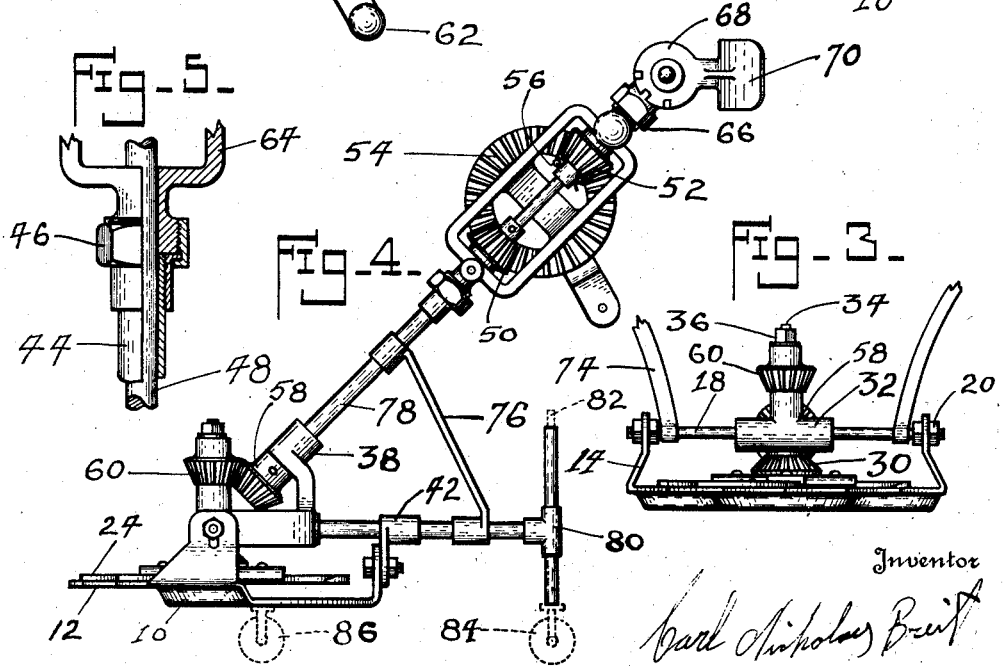
Inventor
Carl Nicholas Breit
By Marguerite McAllister
Attorney Patented Oct. 27, 1925.

1,558,665

UNITED STATES PATENT OFFICE.

CARL NICHOLAUS BREIT, OF LOUISVILLE, KENTUCKY.

HEDGE CUTTER.

Application filed December 21, 1922. Serial No. 608,331.

*To all whom it may concern:*

Be it known that I, CARL NICHOLAUS BREIT, a citizen of the United States, residing at Louisville, in the county of Jefferson and State of Kentucky, have invented certain new and useful Improvements in Hedge Cutters; and I do hereby declare the following to be a full, clear, and exact description of the invention, such as will enable others skilled in the art to which it appertains to make and use the same.

This invention relates to improvements in hedge cutters, and has for one of its principal objects the provision of a device of this sort which shall be simple of operation, possessed of a great deal of cutting power, and capable of universal adjustment, so that it can be operated in very close quarters and from any angle or position.

The present application constitutes a companion case to inventor's prior application for U. S. Letters Patent on a similar device, filed November 15, 1921, Serial No. 515,348.

One of the important features of this invention is the combination, in a single apparatus, of a hedge cutter which can be carried in the hand or supported from the shoulders of the operator, and one, which, by a slight change, can be made capable of being run along the ground and still be manually operated, in the same manner as before.

In addition to the features of universality of adjustment and the varied methods of use, this apparatus presents many other novel and useful objects, as will be apparent from the disclosures in the accompanying drawings and following specification.

The invention, in a preferred form, is illustrated in the drawings and hereinafter more fully described.

In the drawings:

Figure 1 is a top plan view of the improved device of this invention, showing one of the adaptations.

Figure 2 is a side elevation of the apparatus shown in Figure 1.

Figure 3 is a front elevation of the same.

Figure 4 is a side elevation illustrating one of the preferred modifications of the invention a number of attachments having been added.

Figure 5 is a detail view of a portion of the device, parts being shown in section, illustrating the removable swivel mounting feature.

As shown in the drawings:

The reference numeral 10 indicates the base-plate or shear-plate of the machine, having its forward edge formed as a cutting member, and with integral radial projections 12 comprising said cutting members, as best shown in Fig. 1. The rear portion of the plate is bent downwardly as a whole, as illustrated in Fig. 2, so as to provide clearance for the blades, and the sides are turned upwardly in wing form as at 14, and slots 16 are formed in these wings 14 to provide for the reception of a supporting bar 18 which extends transversely of the machine. This bar 18 is adjustably fitted in the slots 16 by means of nuts or the like 20, and sufficient take-up is provided in this manner so that the blades will always give a good cutting surface.

The wings 14 are curved so as to allow the use of the shear in corners and places inaccessible to the present type of lawnmower. Another upwardly extending support or wing 22 is provided at the rear of the shear blade 10, and in this manner a three point suspension is provided for the driving means and the cutting blade support, which will now be described.

The cutting blades are designated at 24 and are preferably four in number, composed of tool steel and curved as shown so as to feed in toward the center of the shear blade 10. These blades are so constructed so that two inches of the same will cut over a corresponding cutting edge of one inch on the plate 10, and they are forged on an angle as shown in order to prevent binding. These blades 24 are removable from the cutting head proper or fly-wheel 26, and have dovetailed shanks adapted to fit into corresponding openings in the fly-wheel, said shanks being secured in position by means of set-screws 28.

The fly-wheel 26 is preferably a casting and has a bevel-gear 30 mounted thereon, and has four integral projecting arms for the reception of the blades 24. Adapted to co-operate with and support the fly-wheel 26 is the head 32 having a vertical opening therethrough with ball-races or other bearings there-in to provide for ease of operation. A vertical shaft 34 is mounted in the head 32 and is secured in place by means of nuts 36 which are adjustable so as to compensate for wear. The head 32 is provided with an integral boss 38 to permit the use of attachments forming the modification illustrated in Fig. 4.

Fastened to the rear wing 22 by means of a bolt 40 is a casting 42 having a cylindrical opening extending therethrough, and adapted to be fitted through this opening is a spindle housing 44 which is hollow, as shown in Fig. 5, and is threaded at both ends to permit same to be fastened into the head 32 and a swivel nut 46. This swivel nut 46 is best shown in Fig. 5, and permits the shearing head to be adjusted at any desired angle.

A drive shaft 48 extends through the spindle housing 44, and has mounted thereon a pair of bevel gears 50 and 52 which are for the purpose of transmitting power from the driving gear 54 to the fly-wheel. The bevel gears 50 and 52 are loosely mounted on the shaft 48, and are adapted to be selectively drivingly connected therewith by means of cotter-pins or the like, as shown at 56 in Fig. 4. In this manner the machine can be driven in the same direction regardless of whether the drive shaft 48 is connected by means of its bevel gear 58 removably mounted on the end thereof, to the bevel gear 30 adjacent the fly-wheel for a horizontal cutting operation from the operator's shoulder, or to the bevel gear 60 at the top of the vertical shaft 34 for operation on the ground.

It will be noted that a driving connection may be had to the fly-wheel from two positions of the power means, as illustrated in Figures 1 and 4 respectively. A handle is fixed to the driving gear 54, as shown at 62, and this gear is rotatably mounted on the gear housing 64 in any preferred manner, and it will be seen that the gear 52 is the driving gear in Fig. 4, and the idle gear in Fig. 1.

A breast plate is adjustably fixed to the gear housing 64 by means of a swivel nut 66, and a ratchet 68 is provided on the breast-plate 70 to permit its being adjusted at any angle to the machine.

An auxiliary handle 72 is also affixed to the gear housing 64 to be grasped by the left hand of the operator and this insures a better operation and a steadier flow of power. Straps 74 are also provided, having their ends fastened to the bar 18 and these straps pass over the shoulders of the operator to steady the machine. The bar 18 is obviously made in two parts which screw into the head 32 from each side thereof, as best shown in Fig. 3.

A bracket 76 is provided adapted to be removably fitted to the spindle housing 44 and has hollow lugs at either end, the upper lug being aligned with the opening in the boss 38 to permit of the insertion of the auxiliary spindle housing 78 as shown in Fig. 4. An attachment 80 is adapted to be affixed to the end of the spindle housing 44, and a shaft 82 having a roller 84 thereon is passed through this attachment. The roller 84 co-operates with two other rollers 86 fitted into screw-threaded openings 88 in the plate 10, thereby providing a support for the device when the same is to be operated on the ground.

I am aware that many changes may be made, and numerous details of the construction varied throughout a wide range without departing from the spirit of this invention, and I therefore do not purpose limiting the patent granted hereon otherwise than as necessitated by the prior art.

I claim as my invention:

1. A hedge cutter including a base plate, cutting edges on said plate, blades movable over said plate, a rotatable support for the blades, a pair of reversely operating driving gears on the support, a power mechanism for operating either of said gears, and a pair of reversely operating driving connections between the power mechanism and the rotatable support.

2. A hedge cutter including a base plate, cutting blades co-operating with said plate, a rotatable support for the blades, a plurality of beveled driving gears on said support, a reversible drive power mechanism for operating either of said gears, and means adapted to provide a plurality of connections between the power mechanism and said beveled gears, adapted to drive the cutting blades in a cutting direction upon both direct and reverse action of said power mechanism.

3. A hedge cutter including a base plate, cutting blades rotatably co-operating with said plate, a rotatable support for the blades, a plurality of driving gears on said support, a power mechanism, and means adapted to provide a plurality of connections between the power mechanism and said gears for operation at different levels, said means including removable and adjustable spindle housings, brackets for supporting said housings, a breast-plate adjustably mounted on the power mechanism, and supporting means for the device adapted to co-operate with the breast-plate.

In testimony whereof I affix my signature.

CARL NICHOLAUS BREIT.